UNITED STATES PATENT OFFICE.

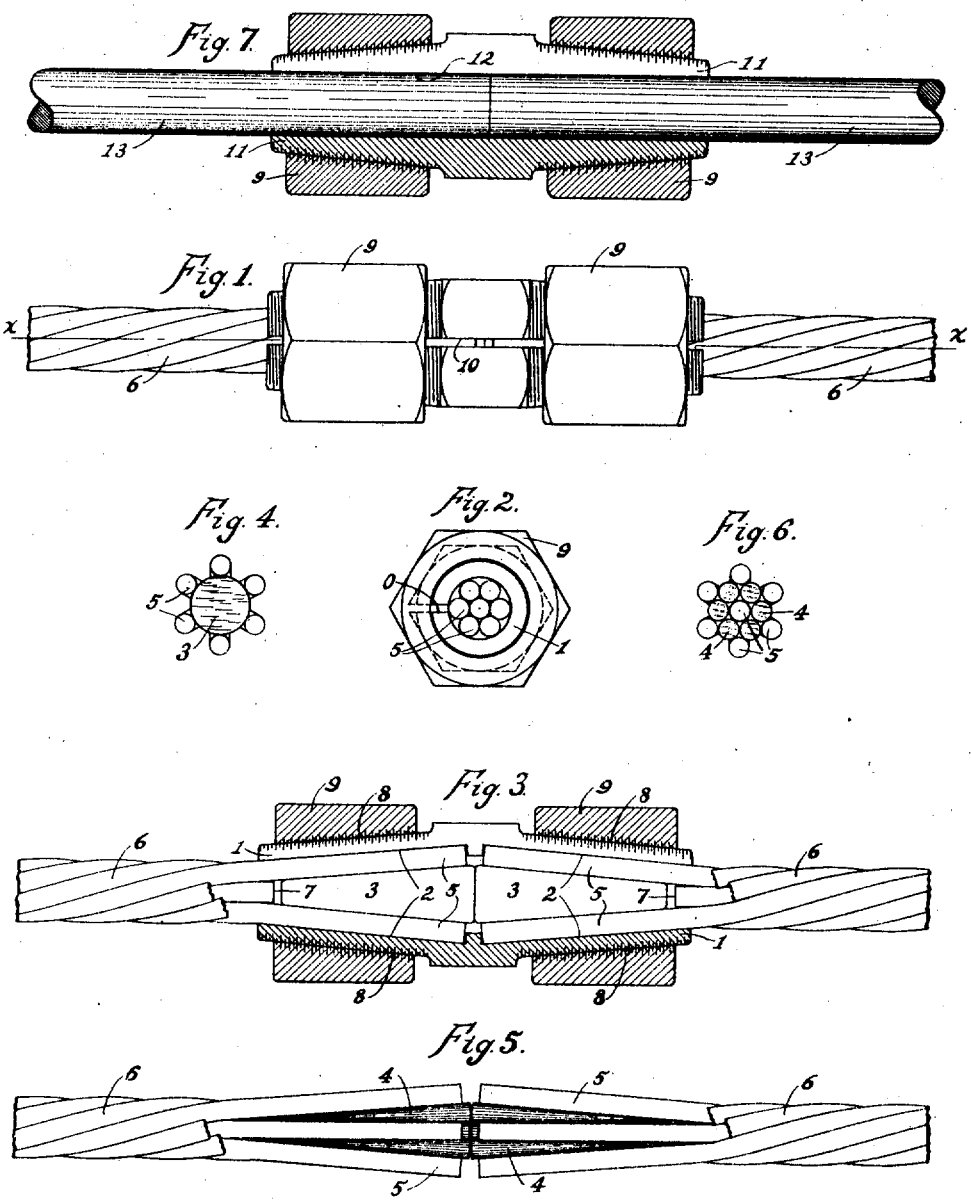

FRANK B. COOK, OF CHICAGO, ILLINOIS.

CONNECTOR FOR ELECTRICAL CONDUCTORS.

No. 901,422.　　　Specification of Letters Patent.　　　Patented Oct. 20, 1908.

Application filed April 2, 1908. Serial No. 424,734.

*To all whom it may concern:*

Be it known that I, FRANK B. COOK, a citizen of the United States of America, residing at Chicago, Cook county, Illinois, have invented a new and useful Connector for Electrical Conductors, of which the following is a specification, reference being had to the accompanying drawings, illustrating same.

This invention relates to connectors for electrical conductors, or for other ropes or strands.

The principal objects of this invention are to provide an improved connector of the character herein set forth, which has increased holding power over other connectors heretofore made; to provide an improved connector for making good electrical connection between two electrical conductors; and to provide a simplified construction in such a connector.

Other objects will be apparent from the following specification.

In this present invention, for connecting a pair of stranded ropes or cables together, I provide a sleeve surrounding the ends of the ropes or cables, which sleeve has a taper from each end thereof toward the center, the taper increasing from the ends toward the center, in combination with wedges which are inserted between the ends of the strands of the ropes or cables, to wedge the said strands out to fit the tapered portions of the sleeve, the wedges for either rope or cable being separate from the wedges for the other rope or cable, whereby the enlarged end portions of the ropes or cables are practically permanently enlarged apart from each other so that they are prevented from pulling out of the sleeve upon excessive tension therealong. In addition to this I also provide means on the sleeve for tightening the tapered portions thereof against the enlarged ends of the ropes or cables.

For connecting the ends of two solid cylindrical conductors together, I provide a sleeve with a straight bore therethrough and means on the exterior portion of the sleeve for clamping same tightly around the cylindrical conductors.

I will now describe my invention more in detail, by reference to the accompanying drawings in which Figure 1 is a side elevation of one form of my connector, showing a pair of stranded ropes or cables connected together therein; Fig. 2 is an end view of Fig. 1; Fig. 3 is a longitudinal cross-sectional view of the a connection shown in Fig. 1, taken on line $x\ x$ of Fig. 1, showing the center strand of each of the stranded ropes or cables cut off and a single wedge inserted in the end of each of the stranded ropes or cables; Fig. 4 is an end view of one of the stranded ropes or cables of Fig. 3, showing a single wedge inserted between the exterior strands of the rope or cable; Fig. 5 shows a modified form of the arrangement shown in Fig. 3, in which modification a number of wedge-shaped pins are inserted between the several strands of each of the stranded ropes or cables, to enlarge the ends thereof, in this case the center strands of the ropes or cables being not cut off shorter than the other strands thereof; Fig. 6 is an end view of one of the stranded ropes or cables shown in Fig. 5, showing the several wedge-shaped pins inserted between the several strands of the rope or cable; and Fig. 7 is a longitudinal cross-sectional view of another modified form of my connector, this form being adapted for connecting the ends of a pair of single strands or conductors together.

Like characters refer to like parts in the several figures.

The sleeve 1 is provided with a taper on the inside thereof, as at 2 2, the said taper increasing from the ends of the sleeve toward the center, in which taper the single pins 3 3 or the plurality of pins 4 4, and the ends of the strands 5 5 of the stranded ropes or cables 6 6 are inserted, preferably as shown in Figs. 3 and 5, the arrangement shown in Fig. 5 being adapted to fit into the sleeve 1 shown in Fig. 3. In inserting these pins 3 3, or 4 4, and the stranded ropes or cables 6 6, into the sleeve 1, the pins are slightly started into the ends of the ropes or cables 6 6, and then the whole is inserted into the ends of the sleeve 1 to the position shown in Fig. 3, or in Fig. 5, the pins in the respective ropes or cables 6 6 coming together and thereby pushing each other farther into the ends of the ropes or cables 6 6 as the latter are forced farther into the sleeve 1, thus wedging the strands 5 5 out into the tapered portions of the sleeve 1 as shown. In the arrangement shown in Fig. 3, the center strands of the respective ropes or cables 6 6 are cut off as shown at 7 7, to allow the large pins 3 3 to enter the centers of the ends of the ropes or cables 6 6 as shown. The exterior surface of the sleeve 1 is also tapered as at 8 8, to correspond with the tapered portions 2 2, the tapered portions 8 8 being threaded to accommodate nuts 9 9 which are also provided with tapered threads therein. The sleeve 1 is split longitudinally from one end to the other, as shown at 10, to enable it to be squeezed around the ropes or cables 6 6 by the nuts 9 9. The middle portion of the exterior surface of the sleeve 1 is preferably formed as a nut so as to be readily grasped by a wrench.

When the ends of the stranded ropes or cables 6 6, with the pins 3 3, or 4 4, therein, are inserted into the sleeve 1 as hereinbefore described, the nuts 9 9 are tightened up on the sleeve 1 so as to clamp the interior tapered portions of the sleeve 1 tightly around the enlarged end portions of the ropes or cables 6 6, the split 10 permitting the sleeve 1 to contract somewhat and thereby tightly grip the ends of the ropes or cables 6 6. This tightly clamps the ends of the ropes or cables 6 6 within the sleeve 1 and thereby makes good electrical connection between the cables 6 6, the said ropes or cables 6 6 not being permitted to slip out of the ends of the sleeve 1 under an excessive tension thereon, because of being enlarged by the wedge-shaped pins 3 3 or 4 4. If the sleeve 1 is not clamped tightly around the enlarged portions of the ropes or cables 6 6 at the beginning, there may be a slight slipping of same within the sleeve 1, but if such slipping is produced the pins 3 3 or 4 4 will also move with the strands 5 5 of the ropes or cables 6 6 and soon tighten the enlarged end portions of the latter within the inner tapered portions of the sleeve 1. Upon an excessive pull on the ropes or cables 6 6 the nuts 9 9 prevent the sleeve 1 from spreading and consequently being ruptured.

Where two single strands or conductors are connected together as shown in Fig. 7, the sleeve 11 is provided with a uniform bore 12 longitudinally therethrough, the exterior surface of the sleeve 11 being tapered and threaded the same as the sleeve shown in Fig. 3, and provided with nuts 9 9 which may be tightened up on the tapered threaded portions of the sleeve 11 and thereby cause the latter to tightly grip the ends of the strands or conductors 13 13, the sleeve 11 being split longitudinally from one end to the other the same as the sleeve shown in Fig. 1. This construction provides a connector which exerts a great holding power on the ends of the strands or conductors 13 13 and makes a good electrical connection between the conductors 13 13.

I do not wish to limit this invention to all of the particular details of construction herein shown, as many modifications of same may be made without departing from the scope of the appended claims.

What I claim as my invention is:

1. A connector of the character described comprising a one-piece sleeve adapted to receive the ends of the strands to be connected, the exterior surface of the sleeve being tapered from the center toward each end and threaded, the sleeve being split longitudinally along one side only, and a nut for each end of the sleeve adapted to be tightened up thereon whereby the sleeve tightly grips the said strands.

2. A connector of the character described comprising a one-piece sleeve adapted to receive the ends of the ropes or cables to be connected, the sleeve being tapered from the middle toward the ends at both the exterior and interior surfaces, a pair of stranded ropes or cables each having wedging means inserted into the end thereof and both being inserted into the opposite ends of the sleeve whereby the said wedging means wedges the strands of each rope or cable outwardly to fit the interior tapered portions of the sleeve, the exterior tapered portions of the sleeve being threaded, the sleeve being split longitudinally along one side only, and a nut for each of the tapered threaded portions adapted to be tightened up thereon whereby the sleeve is caused to tightly grip the enlarged end portions of the ropes or cables to prevent the latter from pulling out of the sleeve.

3. A connector of the character described comprising a one-piece sleeve the interior portion of which is tapered from the center toward the ends, a pair of stranded ropes or cables adapted to be inserted into the opposite ends of the sleeve, wedging means placed between the strands of the ropes or cables whereby the insertion of the latter into the sleeve from the opposite ends thereof forces the said means farther in between the strands of the ropes or cables to enlarge the ends of the latter to fit the tapers in the sleeve, and means for holding the sleeve in place around the ropes or cables for purposes substantially as described.

As inventor of the foregoing I hereunto subscribe my name in the presence of two subscribing witnesses, this 30th day of March, 1908.

FRANK B. COOK.

Witnesses:
FREDERICK R. PARKER,
C. C. NEWBURN.